May 30, 1967
E. H. KURT
3,322,216
ANVIL FOR PERCUSSIVE DRILL
Filed Nov. 18, 1964
2 Sheets-Sheet 1
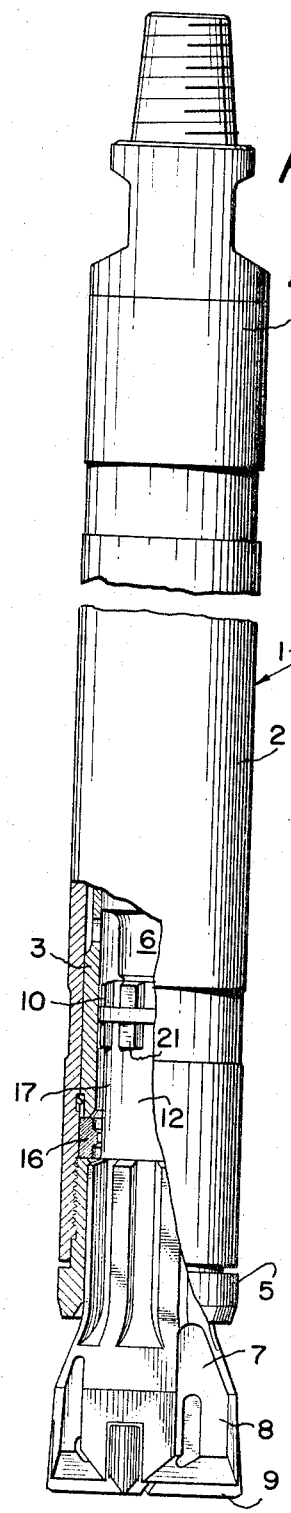
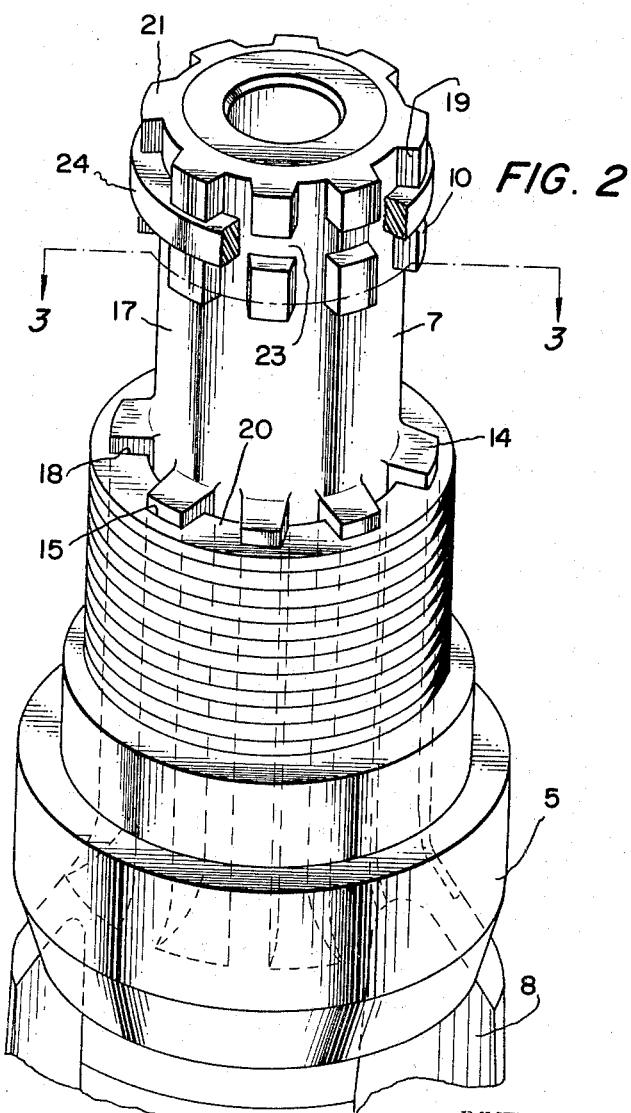
INVENTOR.
EWALD H. KURT
BY
David W. Tilbott
ATTORNEY

United States Patent Office 3,322,216
Patented May 30, 1967

3,322,216
ANVIL FOR PERCUSSIVE DRILL
Ewald H. Kurt, Phillipsburg, N.J., assignor to Ingersoll-Rand Company, New York, N.Y., a corporation of New Jersey
Filed Nov. 18, 1964, Ser. No. 412,134
5 Claims. (Cl. 175—293)

This invention relates to percussive drilling apparatus and particularly to drills known as "downhole" drills. A "downhole" drill has a percussive mechanism which travels down a hole with the drill bit. An example of this type of drill is shown in U.S. Patent No. 3,131,606, issued to E. S. Oelke on May 5, 1964.

In a conventional downhole drill, as shown in the above patent, the drill anvil is integral with the drill bit and is mounted in the lower end of the drill casing so that the anvil serves to seal the air chamber in the drill casing below the percussive piston of the drill. The drill chuck is one-piece and is mounted on the drill bit by sliding it over the drill anvil. Since the drill anvil is larger than the shank of the drill bit and the chuck has to be large enough to slip over the anvil, the chuck is too large to snugly grasp the shank of the drill bit. As a result, the interior grooves in the chuck do not have sufficient depth for the walls of the grooves to have adequate side contact area with the splines on the drill bit to prevent rapid wear and breakage.

The principal purpose of this invention is to solve the foregoing problem by increasing the depth of the interior grooves in the drill chuck while retaining its one-piece construction, thus increasing the side contact area between the walls of the chuck grooves and the drill bit splines.

In brief, the objects of this invention are accomplished by providing the anvil with longitudinal grooves having a spacing corresponding to the spaces between the splines on the drill bit so that a one-piece chuck of smaller interior diameter can pass over the anvil. The anvil further includes a circumferential groove normally filled with a removable ring which closes the longitudinal grooves so that the anvil is the equivalent of a cylindrical anvil, after the chuck is mounted on it.

The invention is described in connection with the accompanying drawing wherein:

FIG. 1 is an elevational view, with portions cut away, of a percussive drill employing this invention:

FIG. 2 is a fragmentary perspective view of the anvil of the drill bit of FIG. 1 with the drill chuck positioned on the shank of the drill bit below the anvil and ready for assembly in the end of the drill casing;

Figure 4:
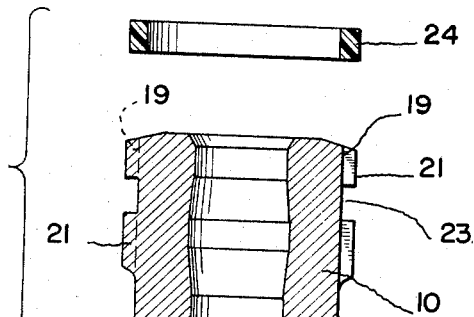
FIG. 4 is a fragmentary section and exploded view of the drill bit anvil of FIGS. 1 to 3 illustrating the mounting of the removable ring on the anvil.

FIG. 1 illustrates this invention applied to a conventional downhole drill 1. This drill 1 conventionally includes an outer wear sleeve 2 housing an inner cylinder 3, a backhead 4 attached to the rear of the wear sleeve 2, a front chuck 5 threaded on the front end of the wear sleeve 2, a reciprocating piston 6 housed in the cylinder 3, and a drill bit 7 slidably mounted in the chuck 5 and carrying a rock-cutting head 8 on its front end. The head 8 contains hard metal inserts 9 which do most of the rock cutting. All of the foregoing elements are conventional. As is well known in the art, the piston 6 reciprocates and hammers the drill bit 7 during the drilling operation.

The drill bit 7 further includes an anvil 10 integrally located on the rear end of the drill bit 7, where it receives the impact of the drill piston 6, and a shank 12 interconnecting the anvil 10 and the drill bit head 8. The shank 12 is of a lesser diameter than the anvil 10 and carries a series of longitudinal splines 14, of less length than the shank 12, sliding in interfitting grooves 15 located inside the chuck 5 so that the chuck 5 locks the bit 7 against rotation relative to the chuck.

The drill bit 7 is prevented from dropping out of the drill 1 by a two-piece lock ring 16 which circles the splineless rear portion 17 of the shank 12 of the drill bit 7, rearward of the rear ends of the splines 14 and forward of the anvil 10. The use of the lock ring 16 is one reason why the anvil 10 has a larger diameter than the shank 12 of the drill bit 7.

Normally, the anvil 10 is cylindrical so that it can fill the front end of the inner cylinder 3 and act to close the air chamber below the piston 6. In the past, the cylindrical shape of the anvil 10 required that the inside of the chuck 5 be large enough to slip over the anvil 10; thus, the walls of the grooves 15 in the chuck 5 did not engage the entire area of the sides of the splines 14 on the drill bit 7.

This invention comprises the idea of making the inside diameter of the chuck 5 small enough to snugly grasp the shank 12 of the drill bit 7 so that the walls 18 of the chuck grooves 15 engage substantially the full depth of the splines 14. In order for the one-piece chuck 5 to slip over the anvil 10, the anvil is provided with a series of longitudinal notches 19 having an angular spacing corresponding to the flutes 20 located between the splines 14. The anvil notches 19 should be in longitudinal alignment with the flutes 20 if the chuck 5 is long enough to bridge the smooth splineless rear portion 17 of the shank 12. If the length of the chuck 5 is shorter than the splineless portion 17, the notches 19 do not have to be in longitudinal alignment with the flutes 20, since the chuck 5 can be rotated after passing over the anvil 10 before passing onto the splines 14. Providing the notches 19 in the anvil 10 leaves a series of longitudinal teeth 21 circling the anvil and spaced apart by the notches 19.

Increasing the depth of engagement between the splines 14 and the chuck groove walls 18 reduces the drill bit wear on the chuck 5 and lessens the chance of breakage of the chuck 5 or splines 14.

The anvil 10 is further provided with a circumferential groove 23 circling the notches 19 and having a depth shown in FIGS. 2 and 4 as substantially corresponding to the diameter of the shank 12. Obviously, the circumferential groove 23 can be deeper than the circumference of the shank 12. After the chuck 5 is assembled on the drill bit 7, the circumferential groove 23 is filled with a removable ring 24 which crosses and closes the notches 19, thus changing the equivalent shape of the anvil 10 to a cylindrical shape. As a result, the anvil 10 can act to seal the lower end of the inner cylinder 3.

Preferably, the ring 24 is endless and is of a yieldable material such as polyurethane which is elastic or yieldable enough to be placed in the groove 23 by being enlarged and passed over the circumference of the anvil 10. However, it could be made of two or more arcuate sections of non-yieldable material such as steel.

SECOND EMBODIMENT—FIG. 5

Figure 5:
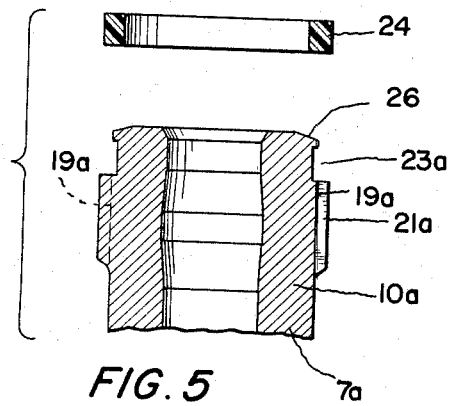
FIG. 5 is a view similar to FIG. 4 showing a second embodiment of the invention.
Figure 3:
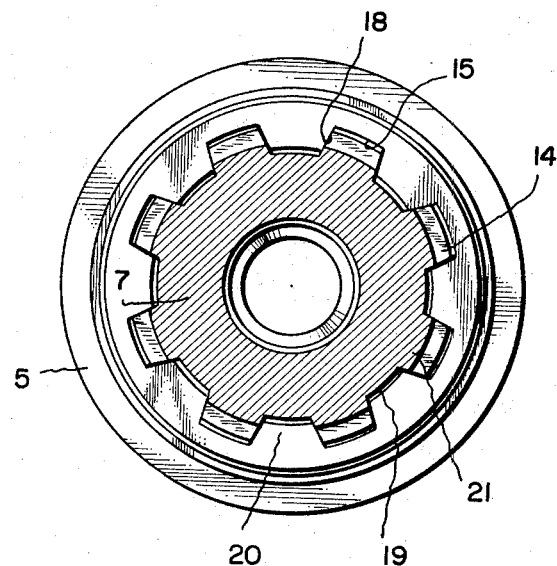
FIG. 3 is a section taken on line 3—3 of FIG. 2.

The anvil 10a of the drill bit 7a shown in FIG. 5 carries a circumferential groove 23a near its top with a shallow flange or rim 26 surrounding the top of the anvil 10a and forming the top wall of the groove 23a. As shown on the drawing, the rim 26 is of less diameter than the anvil 10a or anvil teeth 21a. The elastic ring 24 need only be stretched sufficiently to clear the rim 26 in being placed in the groove 23a, instead of having to clear the anvil teeth 21a as is the case in the first embodiment.

Since the ring 24 in the second embodiment does not have to be stretched as much as in the first embodiment, the ring 24 is easier to place on the second embodiment and can be formed of a less elastic material.

It will be understood that although only one embodiment of the invention is specifically described, the invention may embrace various other embodiments which are obvious from an understanding of the described embodiment and are embraced within the claims of the invention.

Having described my invention, I claim:

1. A bit for a downhole drill, comprising:
   (a) an elongated body;
   (b) an earth cutting surface on one end of said body;
   (c) an intermediate shank on said body carrying longitudinal splines circumferentially spaced by longitudinal flutes;
   (d) an anvil on the other end of said body containing a series of longitudinal notches having a spacing corresponding to the longitudinal flutes between said splines so that an internally grooved chuck can slide over said anvil to a position circling said shank and splines;
   (e) said anvil also containing a circumferential groove circling it and extending through said notches, said groove having a depth which is at least as deep as said notches; and
   (f) a removable seal ring mounted in said circumferential groove to fill it and to close said notches so that said anvil serves as the equivalent of an anvil having a cylindrical shape.

2. The drill bit of claim 1 wherein said removable ring is a one-piece yieldable ring which can be stretched sufficiently to be mounted in said circumferential groove.

3. A drill including:
   (a) a casing containing a percussive piston;
   (b) a drill bit having an integral anvil slidably mounted in one end of said casing;
   (c) said drill bit having an intermediate shank carrying longitudinal splines circumferentially spaced by longitudinal flutes;
   (d) a one-piece chuck surrounding said shank and having longitudinal grooves receiving said splines;
   (e) said anvil having a series of longitudinal notches corresponding to the longitudinal flutes between said splines and a circumferential groove circling it and extending through said notches, said groove having a depth which is at least as deep as said notches; and
   (f) a removable seal ring mounted on said circumferential groove to fill it and to close said notches so that said anvil serves as the equivalent of an avil having a cylindrical shape.

4. The drill of claim 3 wherein said removable ring is a one-piece yieldable ring which can be stretched sufficiently to be mounted in said circumferential groove in said anvil.

5. The drill of claim 4 wherein said circumferential groove is near the top of the anvil and spaced from the anvil top by a flange which has a smaller diameter than the portion of the anvil located below the circumferential groove.

References Cited

UNITED STATES PATENTS

| | | | |
|---|---|---|---|
| 2,810,549 | 10/1957 | Morrison | 175—296 X |
| 2,851,251 | 9/1958 | Mori | 175—296 X |
| 3,131,606 | 5/1964 | Oelke | 91—315 |
| 3,164,214 | 1/1965 | Oelke | 91—315 X |

CHARLES E. O'CONNELL, *Primary Examiner.*

I. A. CALVERT, *Assistant Examiner.*